Jan. 31, 1956  R. H. GEORGE  2,732,854
DRAIN VALVES
Filed Jan. 24, 1952
FIG. 1
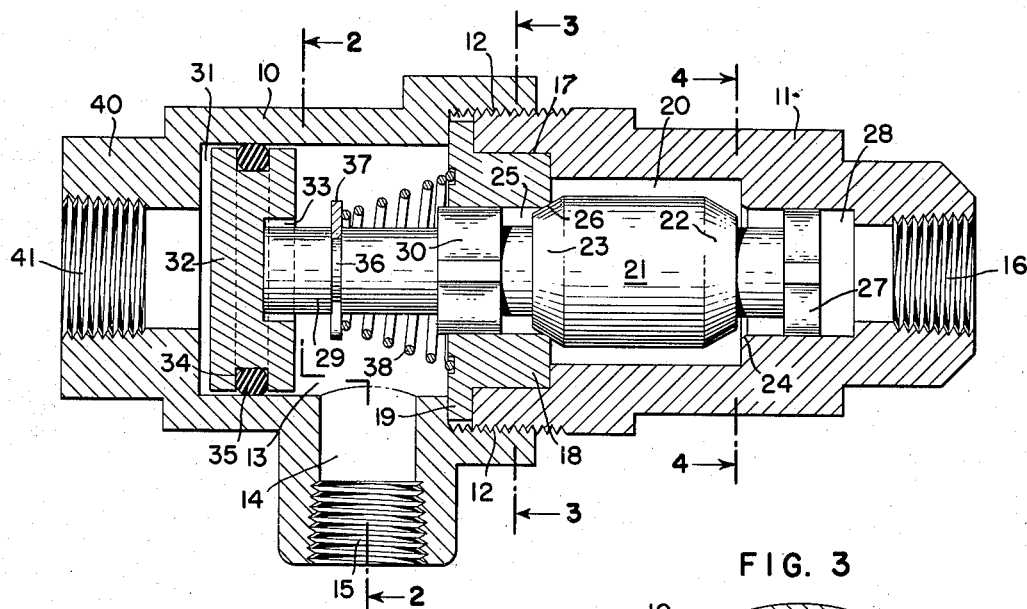
FIG. 2
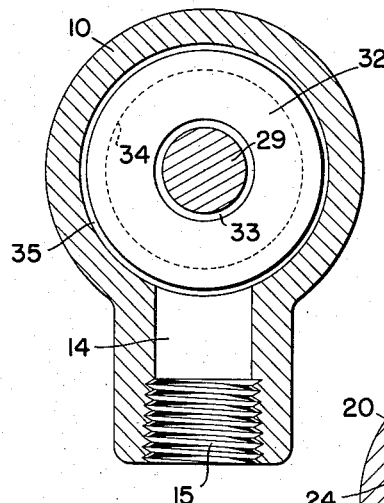
FIG. 3
FIG. 4
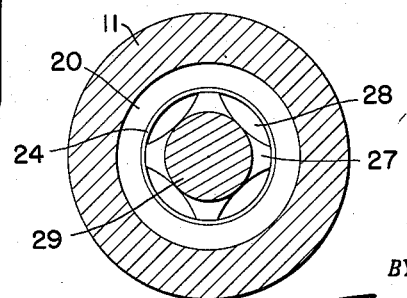
*INVENTOR.*
ROBERT H. GEORGE
BY
*Jas. C. Hobensmith*
ATTORNEY.

United States Patent Office 2,732,854
   Patented Jan. 31, 1956

2,732,854

DRAIN VALVES

Robert H. George, Melrose Park, Pa.

Application January 24, 1952, Serial No. 268,056

2 Claims. (Cl. 137—204)

This invention relates to drain valves, and it relates more particularly to a drain valve which is adapted for the automatic removal of condensate from the air reservoirs and other parts of compressed air apparatus.

More specifically considered, the present invention relates to an improved form of drain valve of the general type described and shown in my application for letters patent filed November 8, 1949, Serial No. 126,220, in my application filed July 27, 1950, Serial No. 176,118, in my application filed November 4, 1950, Serial No. 194,068, now abandoned, and in my application filed January 16, 1951, Serial No. 206,271, now abandoned.

The drain valve of the present invention is much less expensive to make, and it is so constructed and arranged that it may be more readily dismantled and reassembled by persons of relatively little skill, and without the use of special tools, in the event it becomes necessary to take the same apart for the purpose of cleansing or repair.

The principal object of the present invention is to provide a drain valve which is particularly adaptable for the automatic removal of condensate from the air reservoirs, the cooling units, and other parts of compressed air apparatus, which will be less expensive in construction than the valves for that purpose heretofore available.

A further object of the present invention is to provide a valve of the character aforesaid, which will be more simple and certain in its operation.

A further object of the present invention is to provide a valve of the character aforesaid which, in the event of dirt or foreign particles of any sort becoming lodged on the valve seats, may be readily dismantled and cleansed by persons having relatively little skill.

A further object of the present invention is to provide a drain valve of the character aforesaid which may be readily taken apart for the purpose of cleansing and repair, and then easily reassembled without requiring the use of special tools and equipment.

The drain valve of the present invention will be found to be quite useful in connection with the compressed air systems used on automobile trucks and buses for the operation of the brakes and other air operated mechanisms of the vehicle. It will also be found to be useful in various other kinds of compressed air installations, both stationary and portable.

The necessity for the removal, from compressed air apparatus, of the condensate which accumulates from time to time is, of course, well known in the industry.

The nature and characteristic features of the present invention will be more readily understood from the following description, taken in connection with the accompanying drawing forming part hereof, in which:

Figure 1 is a longitudinal central section of a drain valve embodying the main features of the present invention, certain of the internal parts being shown in elevation;

Fig. 2 is a transverse section thereof taken on the line 2—2 of Fig. 1;

Fig. 3 is a transverse section thereof taken on the line 3—3 of Fig. 1; and

Fig. 4 is a transverse section thereof taken on the line 4—4 of Fig. 1.

It should, of course, be understood that the description and drawing herein are illustrative merely, and that various modifications and changes may be made in the structure disclosed without departing from the spirit of the invention.

Referring to the drawing, in the particular embodiment of the invention therein shown, the housing of the valve comprises two parts 10 and 11 threaded to each other as at 12 to provide a separable casing for the internal parts. The part 10 of the housing is provided with an internal drainage chamber 13, having an outlet port 14 in the lower wall thereof, which port is preferably threaded as at 15 for the connection thereto of a pipe (not shown) for carrying the condensate away from the chamber 13 although, if desired, a mere opening in the lower wall of the housing may be used when there is no objection to the free discharge of the condensate at this point.

The outer end of the part 11 of the housing is threaded as at 16, for a pipe connection from the device to be drained, such as air reservoir, or cooling unit, (not shown).

In an annular recess 17, in the inner end of the part 11 of the housing there is mounted a ring member or bushing 18. The ring member or bushing 18 is preferably provided with a flange 19, one face of which is engaged by the inner end of the part 11 of the housing, and other face of which has its rim portion seated on a shoulder provided in the part 11 at the end of the drainage chamber 13.

The foregoing arrangement is such that when the part 11 is unthreaded from the part 10, the ring member or bushing 18, together with the parts carried thereby, may be readily removed from the housing, as will be hereinafter more fully set forth.

Between the bushing 18 and the pipe connection end portion of the part 11 of the housing there is provided a chamber 20 in which the main or body portion of the valve member 21 is located.

The valve member 21 comprises an enlarged cylinder provided with inclined valve faces 22 and 23 at the respective ends thereof. The part 11 of the housing member is provided with a seat 24 at the inlet end of the chamber 20 which is adapted to be engaged by the valve face 22 at one end of the valve member 21.

The bushing 18 has a central passageway 25 which, when open, provides a communication between the chamber 20 and the drainage chamber 13. However, at the outlet end of the valve chamber 20, the bushing 18 is provided with a valve seat 26 upon which the valve face 23, at the other end of the valve member 21, is normally seated to close the passageway 25.

The valve faces 22 and 23 are so spaced that one or both of the passageways between the valve faces and their respective seats is at all times open.

The valve member 21 is provided, adjacent the end thereof at which the seat 24 is located with an enlarged fluted end portion 27 which is guided in the cylindrical passageway 28 between the threaded end 16 of the part 11 of the housing and said valve seat 24 which is located at the inlet end of the valve chamber 20.

The other end of the valve member 21 is provided with a stem 29, also having an enlarged fluted portion 30 which serves as a guide in conjunction with the cylindrical passageway 25 in the bushing 18.

The drainage chamber 13 which is provided in the inner end portion of the part 10 of the housing has an extension in the nature of a cylinder 31 in which a piston disc 32 is slidably mounted. The inner face of the piston disc 32 is provided with a cylindrical recess 33 in which the free end of the stem 29 of the valve member 21 is seated. However, it should be noted that the diameter of the recess 33 is appreciably larger than that of the valve stem 29, so that no difficulty will arise by reason of any difference in alinement between the axis of the piston disc 32 and that of the valve member 21 and the parts in which the said valve member is guided in its longitudinal movement.

The piston disc 32 is provided on its periphery with an annular groove 34 in which an O-ring packing 35 is mounted for the purpose of preventing leakage of the actuation fluid past the piston 32 into the drainage chamber 13.

The valve stem 29 is provided, adjacent the face of the piston disc 32, with an annular groove 36 in which a removable spring washer 37 is mounted.

Interposed between the spring washer 37 and the face of the bushing 18 there is mounted a conical coil spring 38, one end of which bears against the face of the spring washer 37 and the other end of which is seated in a groove in the face of the bushing 18.

The outer end of the part 10 of the housing is provided with an extension 40 internally threaded as at 41 for the connection thereto of a pipe (not shown) which extends from any suitable part of the compressed air apparatus which provides a source of varying air pressure, such as is always found in connection with compressed air apparatus. For example, said pipe may extend from an unloader line, a door opening, a brake pipe, a release valve or the like.

The operation of the device will now be readily understood. The valve member 21 will normally be impelled toward the seat 26 by the tension of the coil spring 38 which is located in the drainage chamber 13, and any condensate which is thrown down in the unit to which the drain valve is connected will pass through the passageway between the valve face 22 and its seat 24 to the chamber 20 provided around the body portion of the valve member 21.

When, however, the pressure in the pipe line which is connected to the end 40 of part 10 of the housing builds up to a certain amount, or whenever the pressure balance in the system is otherwise disturbed, this condition will be transmitted to the face of the piston disc 32 and said piston disc 32 will be slowly impelled against the tension of the spring 38 until the valve face 22 of the valve member is seated on its seat 24.

When the piston disc is thus actuated there will be a certain definite time period during which the valve faces 22 and 23 at both ends of the valve body 21 will be held away a short distance from their respective seats 24 and 26, and any condensate which has accumulated in the valve chamber 20 will be permitted to flow between the valve face 23 and its seat 26, and the flow of the condensate from the device being drained will continue as long as the valve member is in an intermediate position during the time period when the valve member is being impelled from one seat to the other. After the condensate passes into the chamber 13 it will then pass through the port 14 and thus be discharged from the chamber 13.

Heretofore, in the use of drain valves of this type it sometimes happened that foreign objects, such as small pieces of metal, would become lodged on the valve seats, and considerable difficulty arose by reason of the necessity of having highly skilled mechanics available for the purpose of taking the valves apart to remove the objects or other causes of trouble.

The valve of the present invention may be quickly dismantled and the internal parts cleaned by persons having relatively little skill, it being only necessary to separate the parts 10 and 11 of the housing by unthreading one from the other, whereupon the internal parts may be readily removed without the exercise of any skill, or the necessity of using any special tools. However upon the assembly of the parts the bushing 18 will be accurately centered and the valve seats will be in proper alinement at all times. In this manner leakage past the valve seats by reason of mis-alinement will be effectively eliminated.

It will be noted that when the parts 10 and 11 are separated, the bushing 18 may be easily removed from the housing, and if it is necessary to separate the valve member 21 from the bushing 18, this can be readily done by removal of the spring washer 37.

Ordinarily, when the device is dismounted and the parts otherwise separated, the piston disc 32 may be left within the cylinder 31 as the same is not attached to the end of the valve stem 29.

Furthermore, the provision of the enlarged recess 33 in the piston disc 32 enables the device to function properly even though the central axis of the portion 10 of the housing may be out of alinement with respect to the central axis of the portion 11 of the housing.

I claim:

1. A drain valve of the character described comprising a hollow housing made of two separable parts, an internally disposed ring member subdividing the hollow interior of the housing into a valve chamber and a cylinder, said ring member having a portion gripped between portions of the separable parts of the housing and being freely removable upon separation of the housing parts, the valve chamber being located in one of said housing parts and the cylinder being located in the other of said housing parts, means connecting the inlet end of the valve chamber to a unit to be drained of condensate, one end of the cylinder constituting a drainage chamber open to the atmosphere and to which the valve chamber is connected by a passageway in the ring member, the housing part in which the valve chamber is provided having a valve seat at the inlet end and a recess at the outlet end of said valve chamber, and the ring member being mounted in said recess and having a valve seat at the outlet end of said valve chamber, a double faced valve member movably mounted in the valve chamber, a stem extending from said valve member through the passageway in the ring member and having a free end in the cylinder, a piston in the cylinder bearing against the free end of the valve stem acting, when pressure is applied thereto, to move the valve member from the seat provided by the ring member at one end of the valve chamber to the seat provided at the other end thereof, a spring surrounding the valve stem serving to urge the valve member to the seat provided on the ring member, and means connecting the end of the cylinder in which the piston is located to a variable pressure source.

2. A drain valve of the character described comprising a hollow housing made of two separable parts, an internally disposed ring member subdividing the hollow interior of the housing into a valve chamber and a cylinder, said ring member having a portion gripped between portions of the separable parts of the housing and being freely removable upon separation of the housing parts, the valve chamber being located in one of said housing parts, and the cylinder being located in the other of said housing parts, means connecting the inlet end of the valve chamber to a unit to be drained of condensate, one end of the cylinder constituting a drainage chamber open to the atmosphere and to which the valve chamber is connected by a passageway in the ring member, the housing part in which the valve chamber is provided having a valve seat at the inlet end and a recess at the outlet end of said valve chamber, and the ring member being mounted in said recess and having a valve seat at the outlet end of said valve chamber, a double faced valve member movably mounted in the valve chamber, a stem extending from said valve member through the passageway in the ring member and having a free end in the cylinder, a piston in the cylinder bearing against the free end of the valve stem acting, when pressure is applied thereto, to move the valve member from the seat provided by the ring member at one end of the valve chamber to the seat provided by the housing at the other end thereof, a spring surrounding the valve stem serving to urge the valve member to the seat provided on the ring member, one end of said spring bearing against the ring member, a removable washer carried by the valve stem against which the other end of the spring bears, and means connecting the end of the cylinder in which the piston is located to a variable pressure source.

References Cited in the file of this patent

UNITED STATES PATENTS

| | | |
|---|---|---|
| 1,708,172 | Halvorsen | Apr. 9, 1929 |
| 1,983,163 | Buckman | Dec. 4, 1934 |
| 2,128,206 | Hewitt | Aug. 23, 1938 |
| 2,367,605 | Oliver | Jan. 16, 1945 |
| 2,548,236 | Parks | Apr. 10, 1951 |
| 2,582,259 | Koplin et al. | Jan. 15, 1952 |

FOREIGN PATENTS

| | | |
|---|---|---|
| 105,695 | Great Britain | Apr. 26, 1917 |